(No Model.)
J. W. MALOY.
STONE DRESSING MACHINE.
No. 353,149. Patented Nov. 23, 1886.
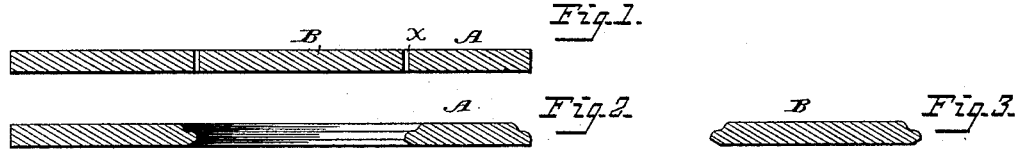
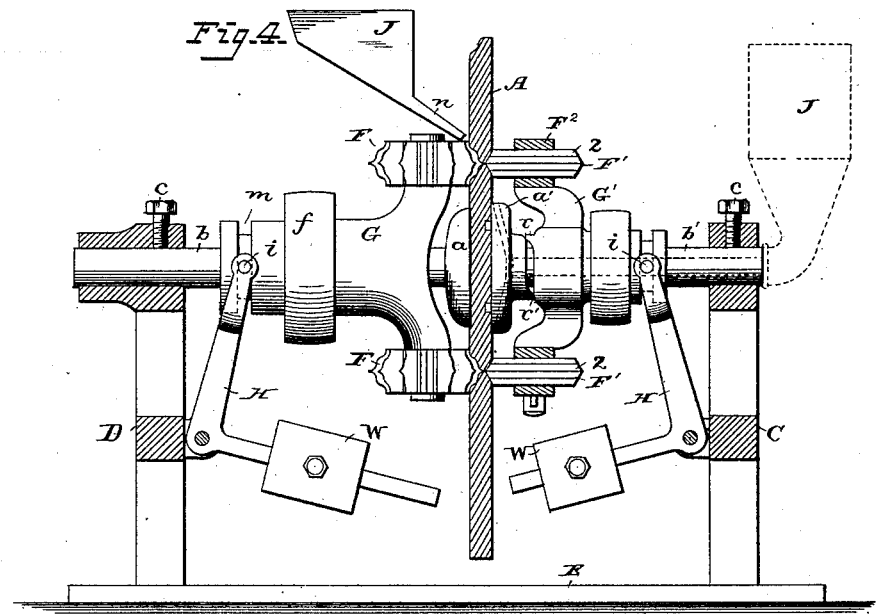
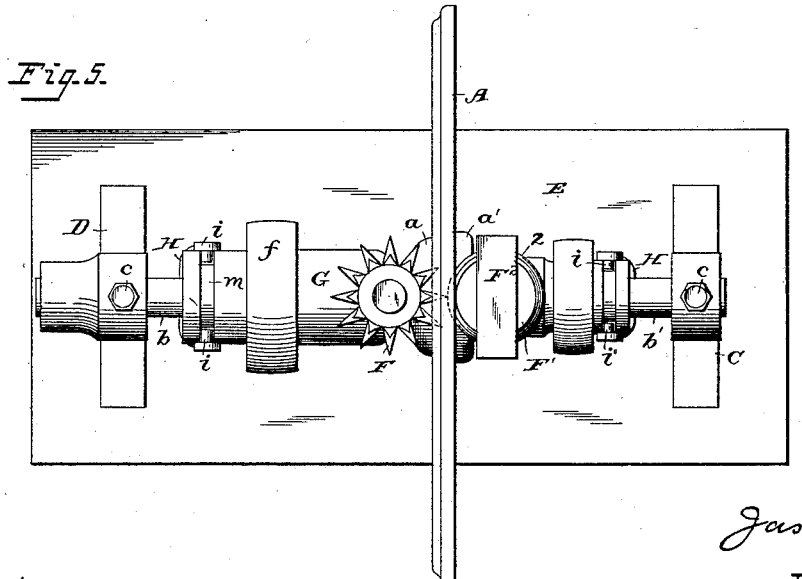
Attest:
Cont. A. Cooper
A. E. Fansmann
Inventor:
Jas. W. Maloy
By Porter & Leeman
Attys.

UNITED STATES PATENT OFFICE.

JAMES W. MALOY, OF SOMERVILLE, MASSACHUSETTS.

STONE-DRESSING MACHINE.

SPECIFICATION forming part of Letters Patent No. 353,149, dated November 23, 1886.

Application filed December 19, 1885. Serial No. 186,190. (No model.)

*To all whom it may concern:*

Be it known that I, JAMES W. MALOY, a citizen of the United States, and a resident of Somerville, in the county of Middlesex and State of Massachusetts, have invented certain new and useful Improvements in Stone-Dressing Machines, of which the following is a specification.

My invention relates to the manufacture of that class of marble tops for wash-stands which are provided with central openings for access to the basins; and my invention consists in apparatus for operating upon each slab, whereby to cut the required opening and impart at the same operation an ornamental finish to the cut edge of the slab and also to the edge of the disk cut therefrom, thereby avoiding the expense of separate operations for cutting out the disk and finishing the edges.

In the drawings, Figure 1 is a sectional view illustrating the ordinary method of cutting slabs in the manufacture of tops for washstands; Figs. 2 and 3, sectional views illustrating parts of a slab cut by my apparatus; Fig. 4, a sectional elevation of a machine used in carrying out my invention; Fig. 5, a plan view of Fig. 4.

In the usual manufacture of marble tops for wash-basins, &c., it is common to cut a slab, A, Fig. 1, of suitable proportions, so as to form a circular opening, by making an annular channel, $x$, by means of any suitable tool, thereby preserving the center portion of the slab within the channel in the form of a circular disk, B, which may be used for a table-top or other purpose. After the opening is formed and the disk B removed the edge of the slab is subjected to the action of a proper tool, so as to impart an ornamental bevel or ogee shape thereto, as shown in Fig. 2, and the edge of the disk B is also operated upon to reduce it to a similar form, as shown in Fig. 3. It will thus be seen that at least three operations are required to form the opening in the slab, remove the disk, and properly shape the edges of the opening and the disk. To avoid expense and delay incident to this series of operations I subject the slab to the action of tools so arranged and operated as to impart the proper forms to the edges in the act of cutting a slab to form the opening and disk. The tool by which this effect is produced travels in circular paths to operate upon the parts to be cut away upon one or both sides of the slab, and is of any of the usual or suitable constructions. The outer portion of the slab is operated upon by one, two, or more cutters, F, carried by a cutter-head, G, revolving upon a shaft, $b$. The head G is rotated by any suitable means—as, for instance, by means of a belt passing round the band-pulley $f$ upon the head; and in order to force the cutters toward the slab when the latter is horizontal, I either feed the head positively or press it toward the slab by means of a weight, W.

One means of using the weight is illustrated in the drawings, and consists in applying it to the lower arm of the bell-crank lever H, pivoted at its corner to the frame D, the upper forked end of the lever carrying studs $i$, projecting into an annular groove, $m$, in the head G. This arrangement permits the free revolution of the head and allows it to be drawn back and forth upon the shaft $b$, while forcing it with a regulated pressure toward the slab when the cutters are in operation. When it is desired to cut from both sides of the slab at the same time, a second head, G', is arranged to revolve upon the shaft $b'$, and carries a second set of cutters, F'.

A preferable form of cutter consists of a series of annular blades, 2, one inclosing the other, and set so that their edges will present a cutting-face of proper form, all being held tightly in place by a circumferential band, $F^2$, which may be contracted to bind the cutter-blades together.

The sand and water necessary to facilitate the cutting operations in most instances is fed from the hopper to the part to be cut by means of suitable conductors. For instance, the hopper J may be suspended, as shown at the left in Fig. 4, a conducting-spout, $n$, extending from the hopper to the slab adjacent to the cut; or the hopper may communicate with a channel extending through the shaft and communicating with the radiating distributing-channels, as shown in dotted lines, in connection with the shaft $b'$.

When an annular cutter is used, it is best to move it away from the slab at intervals to permit the sand to get beneath the cutting-edges.

This is done by reciprocating the cutter-head in any suitable manner. For instance, a beveled lug, r, on the head G' strikes a like lug, r', on the clamp-head a' at each revolution, and this causes the head to move back slightly.

It will be seen that by operating upon the slab as above described the basin-opening is formed, the central disk cut out, and an ornamental edge is imparted to both at a single operation, thereby greatly reducing the cost of the manufacture.

The cutters herein shown and described are not claimed in this application, as they are shown and claimed in an application filed by me on December 18, 1885, No. 186,021.

Without limiting myself to the precise construction and arrangement of parts shown, I claim—

1. The combination, in a stone-cutting machine, of a support for holding a slab to be cut, carried by a shaft perpendicular to the face of the support, a head carried by the shaft, and one or more cutters carried by the head, and each with a central projecting portion, whereby to cut in the slab an annular channel with bevel or curved sides, substantially as set forth.

2. The combination of a holder supporting the slab, heads supported by shafts upon opposite sides of the said holder, and cutters carried by the heads and constructed with projecting central portions, and all arranged at the same radial distance from the axis of the shaft, to simultaneously cut an annular channel from opposite sides of the slab and impart an ornamental shape to the edges of the parts cut, substantially as set forth.

3. The combination of a frame, supporting-shafts b b', axially in line with each other, and provided with clamping-heads a a', and a revolving head upon each shaft, carrying one or more cutters, and means, substantially as described, for feeding the head toward the slab, for the purpose set forth.

4. The combination, with a revolving cutter-head carrying an annular cutter, and with supports for the slab, of contracting devices, such as lugs on the cutter-head carrier and on the slab-support, for automatically lifting the head at each revolution to carry the cutter at intervals wholly from the slab, substantially as described.

In testimony whereof I have signed my name to this specification in the presence of two subscribing witnesses.

JAMES W. MALOY.

Witnesses:
H. C. DERBY,
ALFRED SCHOFF.